(12) United States Patent
Ikeda et al.

(10) Patent No.: US 7,779,966 B2
(45) Date of Patent: Aug. 24, 2010

(54) FRONT ROTARY WORKING MACHINE

(75) Inventors: Takashi Ikeda, Wako (JP); Masatoshi Nagaoka, Wako (JP)

(73) Assignee: Honda Motor Co., Ltd. (JP)

( * ) Notice: Subject to any disclaimer, the term of this patent is extended or adjusted under 35 U.S.C. 154(b) by 1248 days.

(21) Appl. No.: 11/208,866

(22) Filed: Aug. 22, 2005

(65) Prior Publication Data

US 2006/0037764 A1 Feb. 23, 2006

(30) Foreign Application Priority Data

Aug. 23, 2004 (JP) .............................. 2004-242369

(51) Int. Cl.
*F16N 33/00* (2006.01)
*A01B 33/00* (2006.01)

(52) U.S. Cl. .......................................... 184/1.5; 172/42

(58) Field of Classification Search ................... 184/1.5, 184/6.27; 172/42, 123, 125
See application file for complete search history.

(56) References Cited

U.S. PATENT DOCUMENTS 5,655,624 A * 8/1997 Kelly, Jr. ...................... 184/1.5

FOREIGN PATENT DOCUMENTS

JP 02211450 7/2002

* cited by examiner

*Primary Examiner*—Robert A Siconolfi
*Assistant Examiner*—Vu Q Nguyen
(74) *Attorney, Agent, or Firm*—Adams & Wilks

(57) ABSTRACT

A front rotary working machine has an engine and a transmission case of a power transmission mounted to a lower portion of the engine. The transmission case comprises a case body and a clutch case. An oil outlet is provided for discharging engine oil formed in the clutch case. An oil receiving portion has an outflow path and is formed in the clutch case and disposed directly below the oil outlet. A fastening boss is formed in the case body for fastening the case body to the clutch case so that an outer surface of the fastening boss is positioned substantially directly below and adjacent to an opening of the outflow path of the oil receiving portion. Rotary working portions are provided at a front portion of the transmission case.

20 Claims, 7 Drawing Sheets

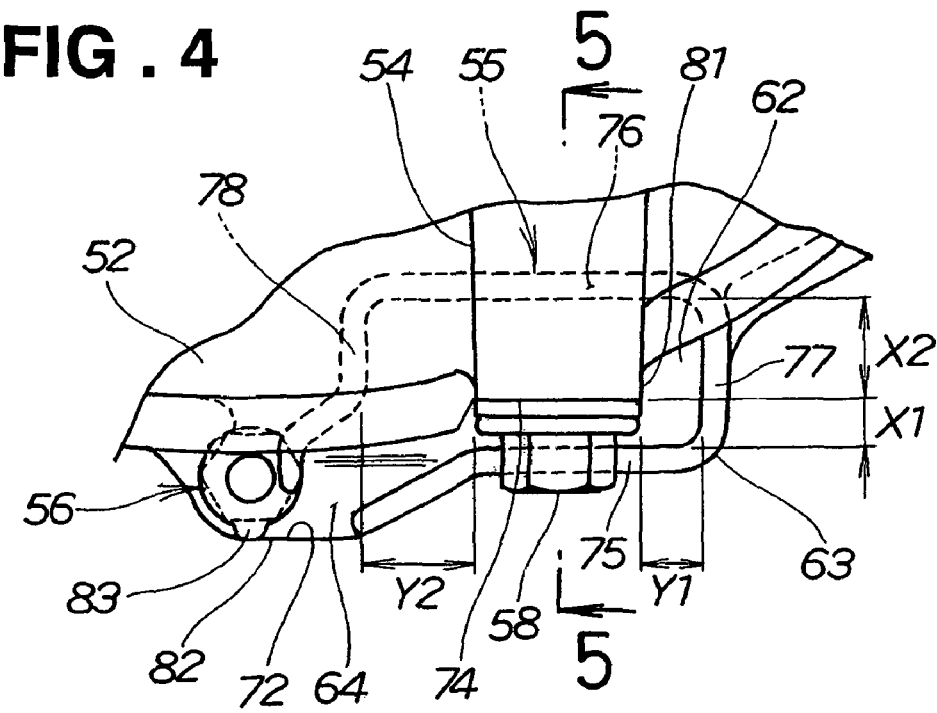
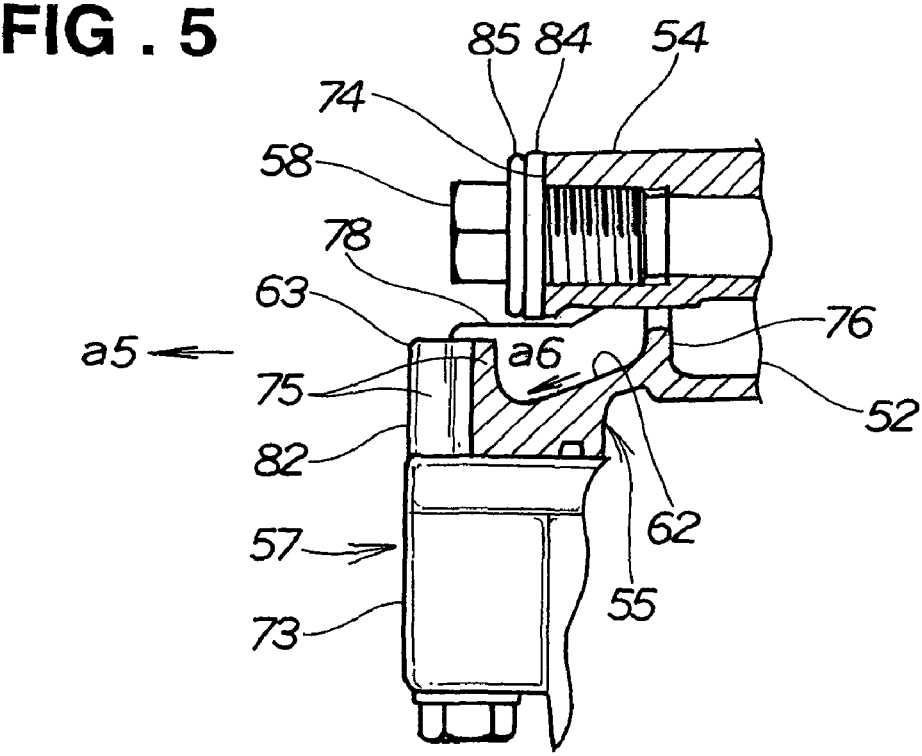

FRONT ROTARY WORKING MACHINE

FIELD OF THE INVENTION

The present invention relates to front rotary working machines with an outlet of engine oil formed in a transmission case.

BACKGROUND OF THE INVENTION

A walk-behind tiller having an outlet of engine oil formed in a transmission case is disclosed, for example, in JP-A-2002-211450. This tiller will be described with reference to FIG. 8 hereof.

A walk-behind tiller 101 in the related art shown in FIG. 8 is provided with a balance weight 103 and an engine 104 at the front of a body 102. The engine 104 is provided with an oil filler port 105 from which to feed engine oil, and a drain port 106 from which to discharge engine oil. The engine oil is discharged from the drain port 106 without removing the balance weight 103.

In this walk-behind tiller 101, however, when the engine oil is discharged from the drain port (oil outlet) 106, the engine oil can run along the drain port 106, spreading to an area near the drain port 106 or to the body 102, and adhering thereto. It takes time to wipe off the adhering engine oil.

If the adhering engine oil is not sufficiently wiped off, and left, the left engine oil causes earth, grass or dust to attach to the area near the drain port 106 or to the body 102 and make it dirty.

There is demand in the art for preventing spreading of engine oil flowing along an oil outlet, facilitating wiping-off of adhering engine oil, and reducing dirt such as earth, grass or dust attaching to an area by the engine oil flowing thereto.

SUMMARY OF THE INVENTION

The present invention provides a front rotary working machine which comprises an engine; a transmission case of a power transmission mounted to a lower portion of the engine; an oil outlet for discharging engine oil formed in the transmission case; and rotary working portions provided at a front portion of the transmission case; the transmission case comprising an oil receiving portion disposed directly below the oil outlet; an outflow path formed in the oil receiving portion; an outer surface of a fastening boss formed nearly directly below and continuously with an opening of the outflow path; and a head of a bolt disposed at a lower end of the boss.

The engine oil discharged from the oil outlet runs from the oil receiving portion, down the boss, and finally drips from the head of the bolt, and thus is prevented from spreading to the outer surface of the transmission case. Accordingly, the engine oil running along the oil outlet can be prevented from spreading, and the engine oil adhering to the boss can be easily wiped off. Also, an area to which the engine oil adheres is reduced, resulting in reduced dirt such as earth, grass or dust attaching to the engine oil.

The outflow path is preferably formed with a bottom portion and a plurality of side portions rising from the periphery of the bottom portion, and the bottom portion is inclined downward toward the outside of the transmission case. This allows the engine oil discharged from the oil outlet to smoothly flow from the outflow path to the boss.

BRIEF DESCRIPTION OF THE DRAWINGS

A preferred embodiment of the present invention will be described in detail below, by way of example only, with reference to the accompanying drawings, in which:

FIG. 4 is a view taken in the direction of arrow 4 of FIG. 2, showing the relationship between an oil outlet and the oil receiving portion;

FIG. 5 is a cross-sectional view taken along line 5-5 of FIG. 4;

DETAILED DESCRIPTION OF THE PREFERRED EMBODIMENT

An embodiment of the present invention will be described with a tiller illustrated as an example of a front rotary working machine.

Figure 1:
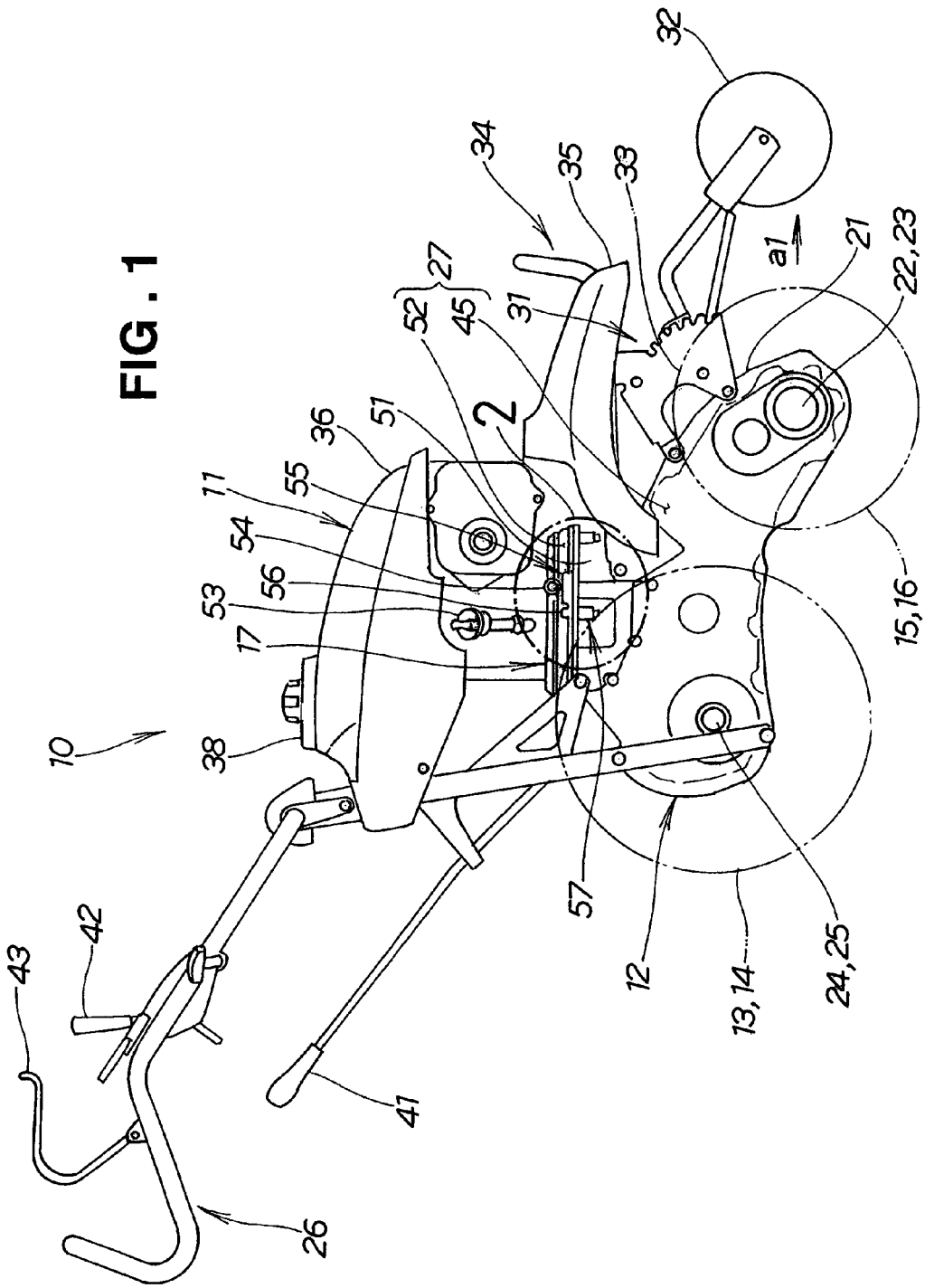
FIG. 1 is a side view of a front rotary working machine (tiller) in the present invention provided with an oil receiving portion.

A front rotary working machine (tiller) 10 in this embodiment shown in FIG. 1 is an agricultural machine configured to transmit power from an engine 11 through a power transmission 12 to left and right drive wheels 13 and 14, and left and right rotary working portions 15 and 16 disposed forward of the drive wheels 13 and 14. With the rotary working portions 15 and 16, an agricultural field is plowed.

The front rotary working machine 10 includes the power transmission 12 mounted to the bottom of the engine 11 via a clutch 17, the rotary working portions 15 and 16 rotatably mounted to a front portion 21 of the power transmission 12 via left and right working drive shafts 22 and 23, the drive wheels 13 and 14 rotatably mounted to a rear portion of the power transmission 12 via left and right axles 24 and 25, and a handle 26 extending from a rear portion of the power transmission 12 rearward and obliquely upward.

The rotary working portions 15 and 16 are disposed at the front portion 21 of the transmission case 27. A front wheel (travel auxiliary wheel) 32 is mounted to the front portion 21 via a support device 31. The front wheel 32 is disposed forward of the rotary working portions 15 and 16 (in the direction of arrow a1). A guard member 34 for guarding an upper side 33 of the rotary working portions 15 and 16 extends forward from the transmission case 27 as shown by arrow a1.

Reference numeral 35 denotes a fender covering the upper side of the power transmission 12 and the rotary working portions 15 and 16. Reference numeral 36 denotes an engine cover covering the upper side of the engine 11; 38, a fuel tank; 41, a shift lever; 42, a differential lock lever; and 43, a clutch lever.

The transmission case 27 includes a case body 45 and a clutch case 52 mounted to an upper portion 51 of the case body 45. The clutch case 52 is formed with an oil feed port 53 from which to feed engine oil. An oil outlet 54 of the engine oil is formed in the clutch case 52 in a position near the oil feed port 53. An oil receiving portion 55 is formed near the oil outlet 54. An internally threaded boss 56 is formed continuously with the oil receiving portion 55. A fastening boss 57 is formed at the case body 45.

The transmission case 27 is made by aluminum die-casting using an aluminum alloy.

Figure 2:
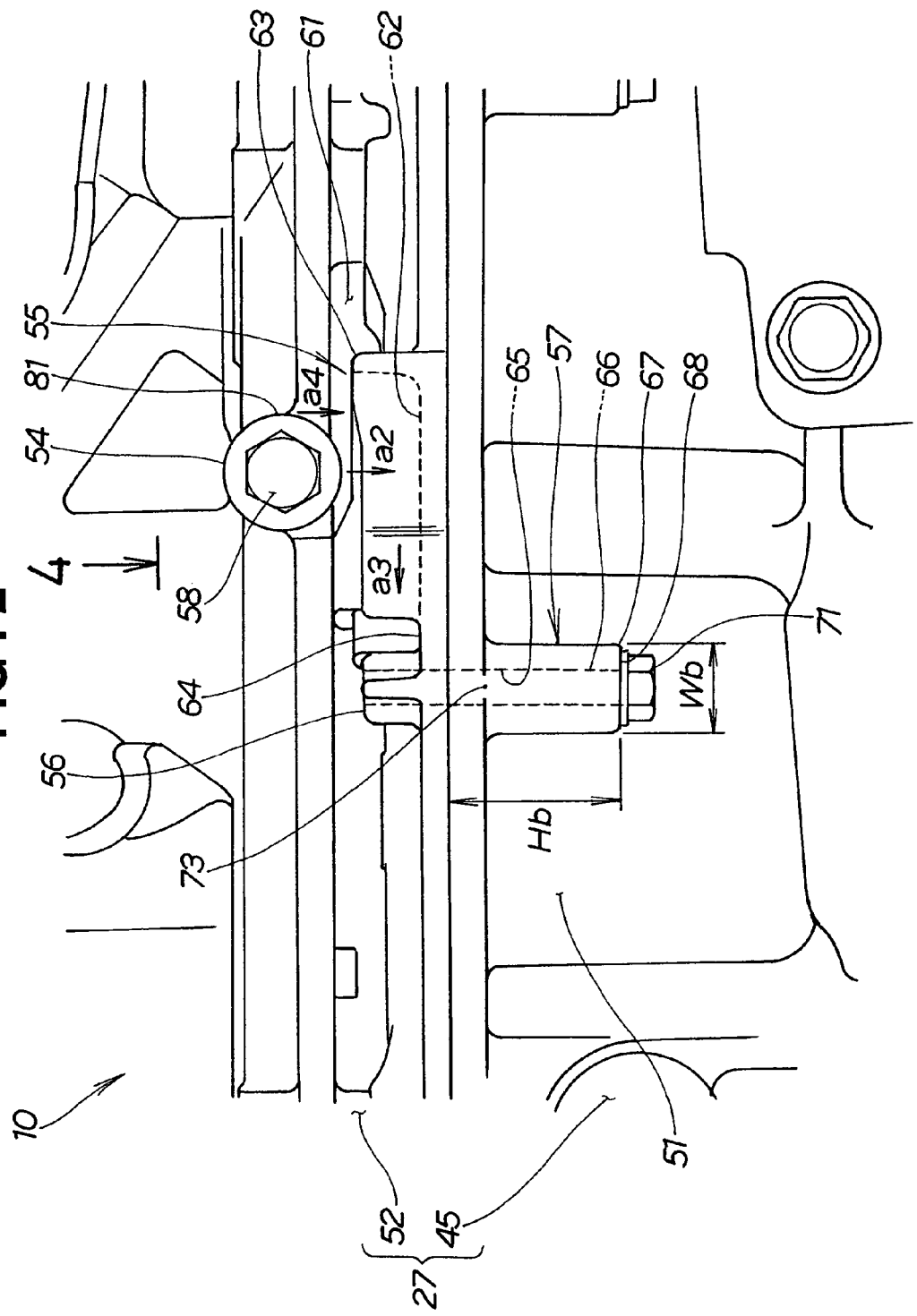
FIG. 2 is an enlarged detail view of portion 2 in FIG. 1.

FIG. 2 shows the oil outlet 54, the oil receiving portion 55 and the boss 57 shown in FIG. 1.

The oil outlet 54 constitutes a flow path through which the engine oil is drained from the clutch case 52 when changing the engine oil in the clutch case 52. Reference numeral 58 denotes a plug bolt screwed into the oil outlet 54 to close the oil outlet 54.

The oil receiving portion 55 is disposed directly below the oil outlet 54 (in the direction of arrow a2). The oil receiving portion 55 includes a bottom portion 62 formed continuously with an outer surface 61 of the clutch case 52, a side portion 63 formed continuously with the bottom portion 62, and an outflow path 64 formed in the side portion 63 with a downslope lower than the bottom portion 62.

The bottom portion 62 is formed with a downslope so that fluid runs down in the direction of arrow a3.

The boss 57 is a protruded portion formed integrally with the case body 45 of the transmission case 27. The boss 57 has a height of Hb and a width of Wb. The boss 57 is formed with a bolt hole 65 through which a bolt (fastener) 66 extends. A lower end 67 of the boss 57 constitutes a bearing surface 68. A head 71 of the bolt 66 abuts on the bearing surface 68.

Figure 3:
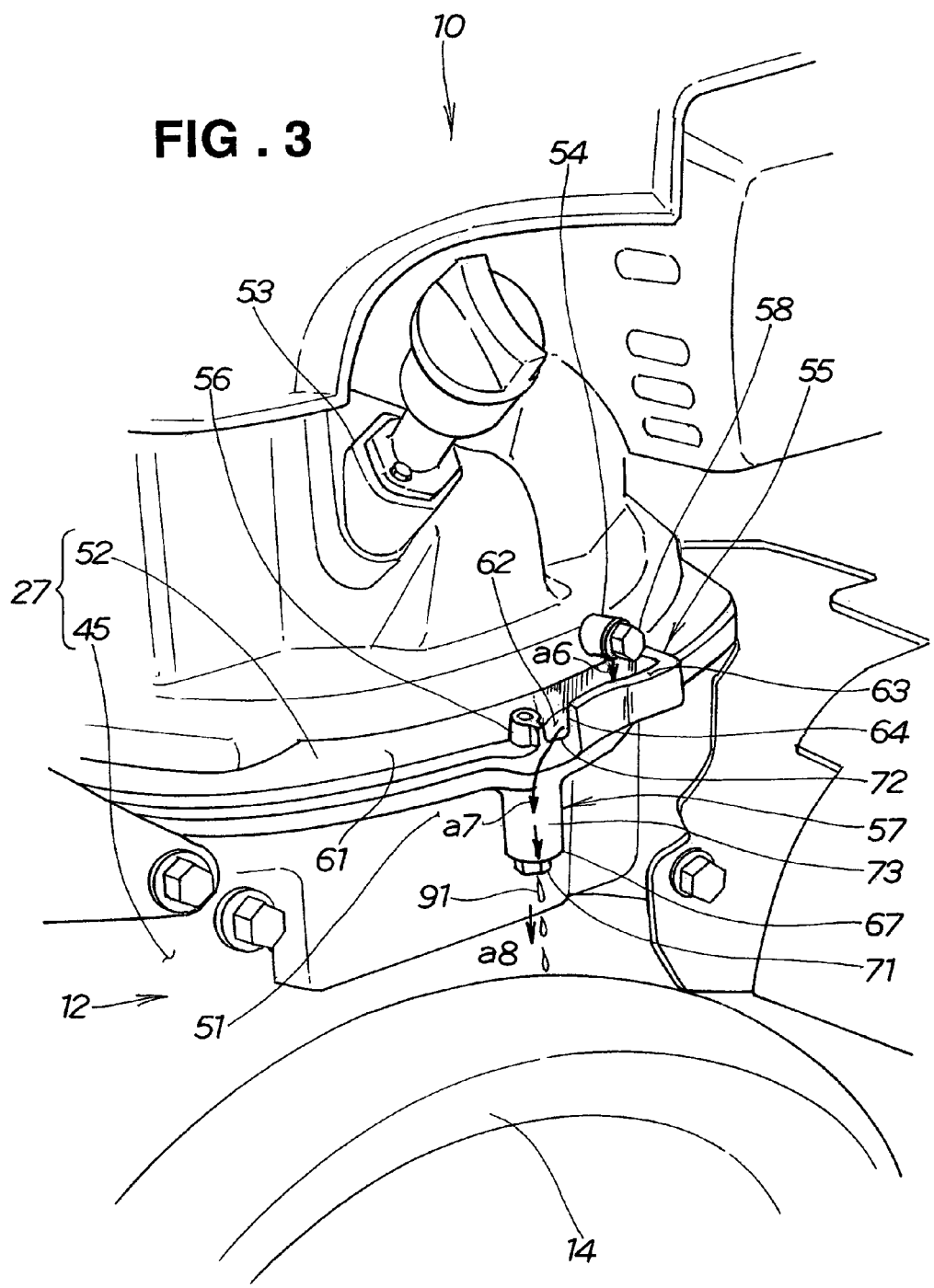
FIG. 3 is a perspective view of the oil receiving portion formed at a transmission case.

FIG. 3 shows the oil receiving portion 55 formed at the transmission case 27 in a perspective view.

The transmission case 27 includes, as already described, the oil receiving portion 55 disposed directly below the oil outlet 54, the outflow path 64 formed in the oil receiving portion 55, an outer surface 73 of the fastening boss 57 formed nearly directly below and continuously with an opening 72 of the outflow path 64, and the head 71 of the bolt 66 (see FIG. 2) disposed at the lower end 67 of the boss 57.

FIG. 4 shows in a plan view the oil outlet 54 and the oil receiving portion 55 shown in FIG. 2.

An end face 74 of the oil outlet 54 corresponds in location to the bottom portion 62 and the side portion 63 (including first to fourth side portions 75 to 78). The end face 74 is disposed above a substantially middle portion of the bottom portion 62. Specifically, the distance from the end face 74 to the first side portion 75 is X1; the distance to the second side portion 76 is X2; the distance to the third side portion 77 is Y1; and the distance to the fourth side portion is Y2.

The end face 74 of the oil outlet 54 is thus located above the bottom portion 62 in an area formed by the side portion 63 (including the first to fourth side portions 75 to 78). Therefore, if the engine oil directly drips (in the direction of arrow a4 in FIG. 2) from the periphery of the end face 74 of the oil outlet 54 (e.g., a front side 81), the oil receiving portion 55 can properly receive the engine oil.

The outflow path 64 extends from the bottom portion 62 to an outer surface 82 of the clutch case 52, so that the engine oil is directed to the outer surface 82.

The internally threaded boss 56 is formed with a rib 83 lying along the outflow path 64 and conforming to the outer surface 82 of the clutch case 52. The rib 83 can be used as a flow path for reducing weight.

It is also possible to eliminate the rib 83 and conform the outer surface of the internally threaded boss 56 to the outer surface 82 of the clutch case 52.

FIG. 5 shows a cross section of the oil outlet 54 and the oil receiving portion 55.

At the oil outlet 54, packing 84 is firmly attached to the end face 74 by the plug bolt 58 with a washer 85 interposed therebetween, to close the oil outlet 54. Conversely, to open the oil outlet 54, the plug bolt 58 is unscrewed, or the plug bolt 58, the packing 84 and the washer 85 are removed.

The bottom portion 62 is inclined with a downslope (in the direction of arrow a6) outward (in the direction of arrow a5) to direct the engine oil to the outer surface 82 located outward of the clutch case 52 (in the direction of arrow a5), thereby to direct the engine oil to the outer surface 73 of the boss 57.

Figure 6:
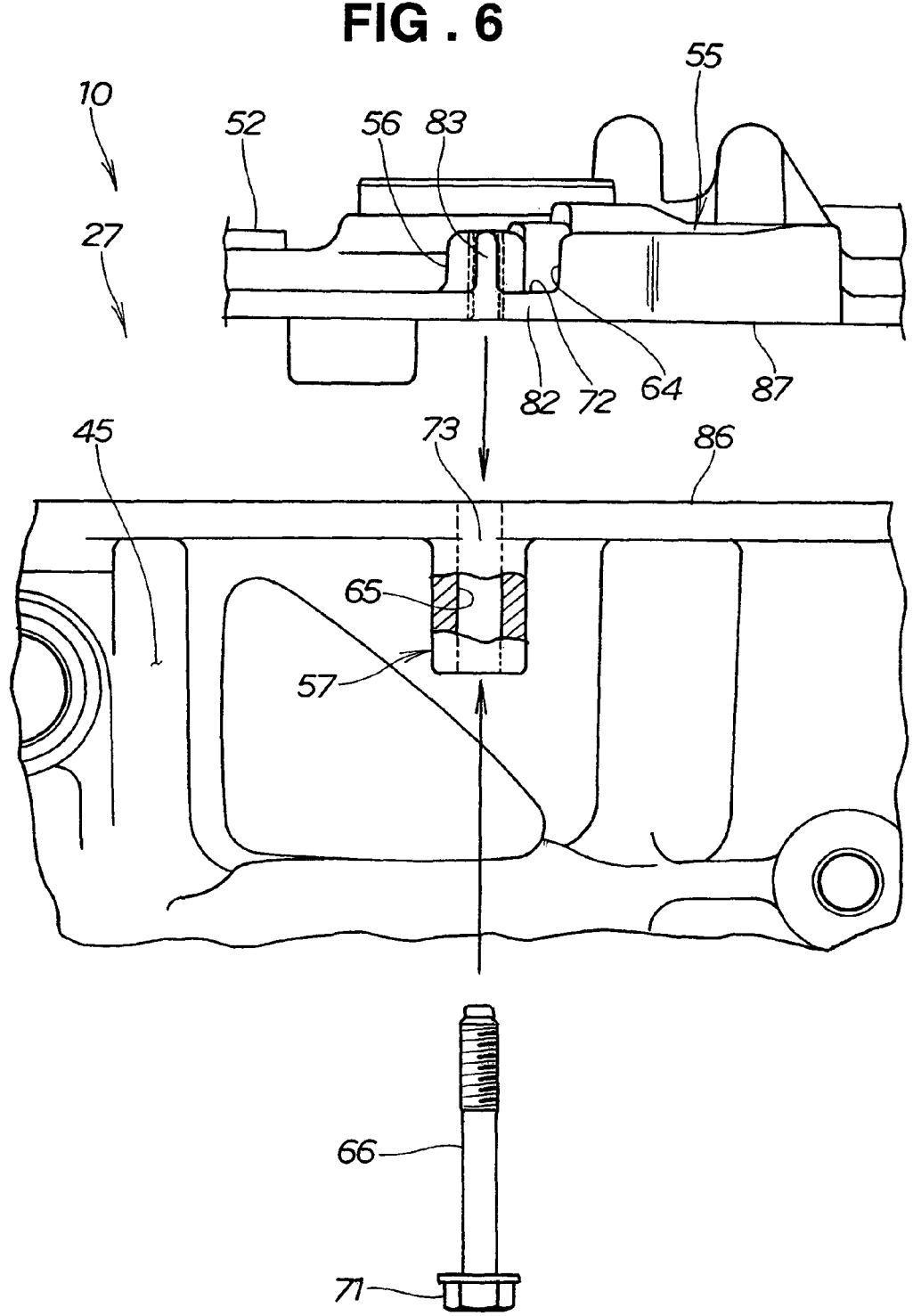
FIG. 6 is a diagram showing assemblage of a case body and a clutch case which constitute the transmission case.

Next, with reference to FIG. 6, the assemblage of the case body 45 and the clutch case 52 of the transmission case 27 will be described.

To assemble the case body 45 and the clutch case 52 together, an abutting portion 87 formed at the lower end of the clutch case 52 is placed on an abutting portion 86 formed at the upper end of the case body 45; and the bolt 66 is inserted through the bolt hole 65 in the boss 57 and screwed into the internally threaded boss 56. Similarly, a plurality of bolts not shown are screwed in, whereby the clutch case 52 is mounted to the case body 45.

The oil receiving portion 55 is formed continuously with the abutting portion 87 at the lower end of the clutch case 52. Therefore, the engine oil directly flows to the case body 45 of the transmission case 27 through the opening 72 of the outflow path 64 in the oil receiving portion 55, and at the same instant, flows to the outer surface 73 of the boss 57 formed at the case body 45. Consequently, the engine oil 91 (see FIG. 7) flowing down them can be prevented from spreading.

Figure 7:
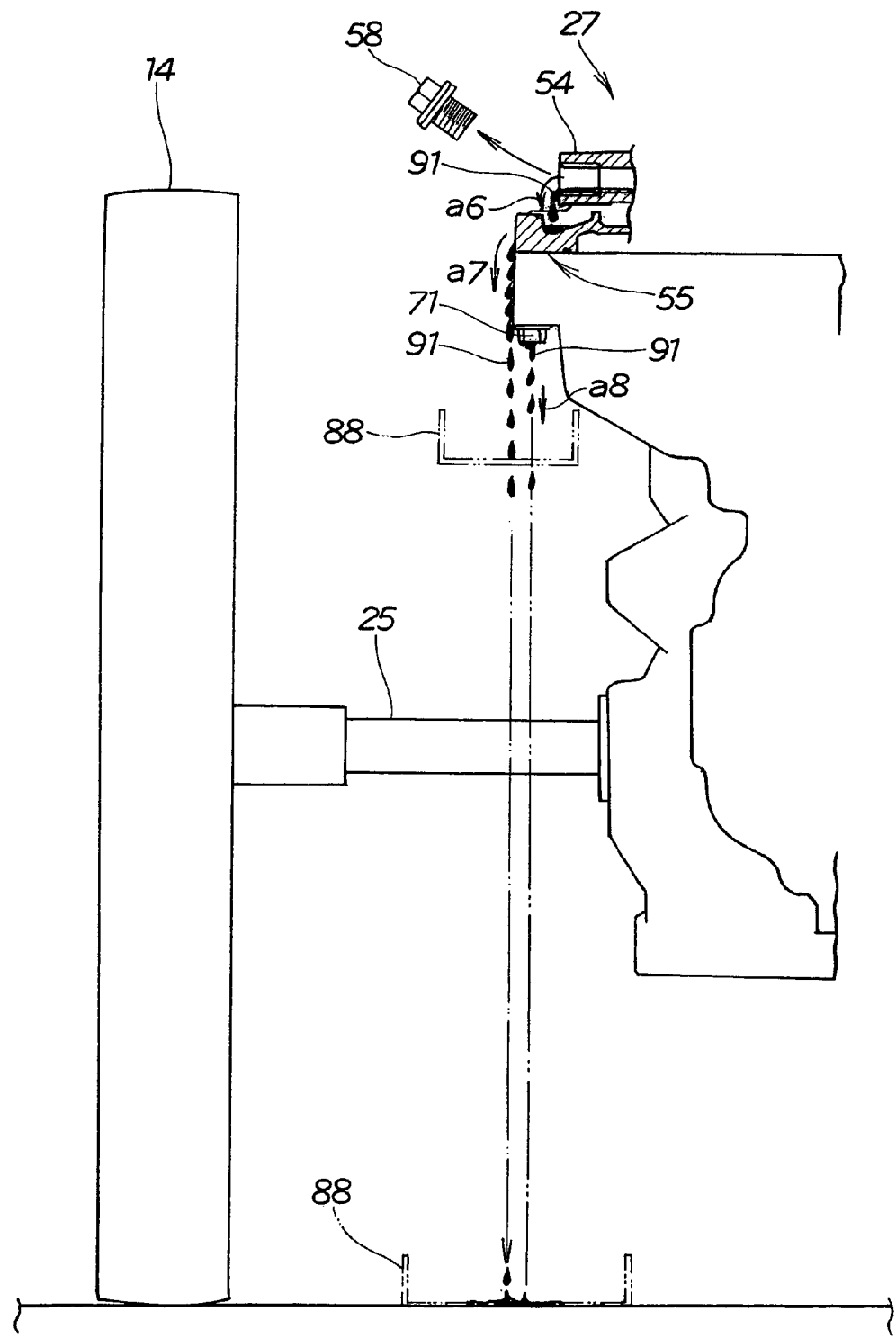
FIG. 7 is a diagram showing the flow of engine oil discharged from the oil outlet.
Figure 8:
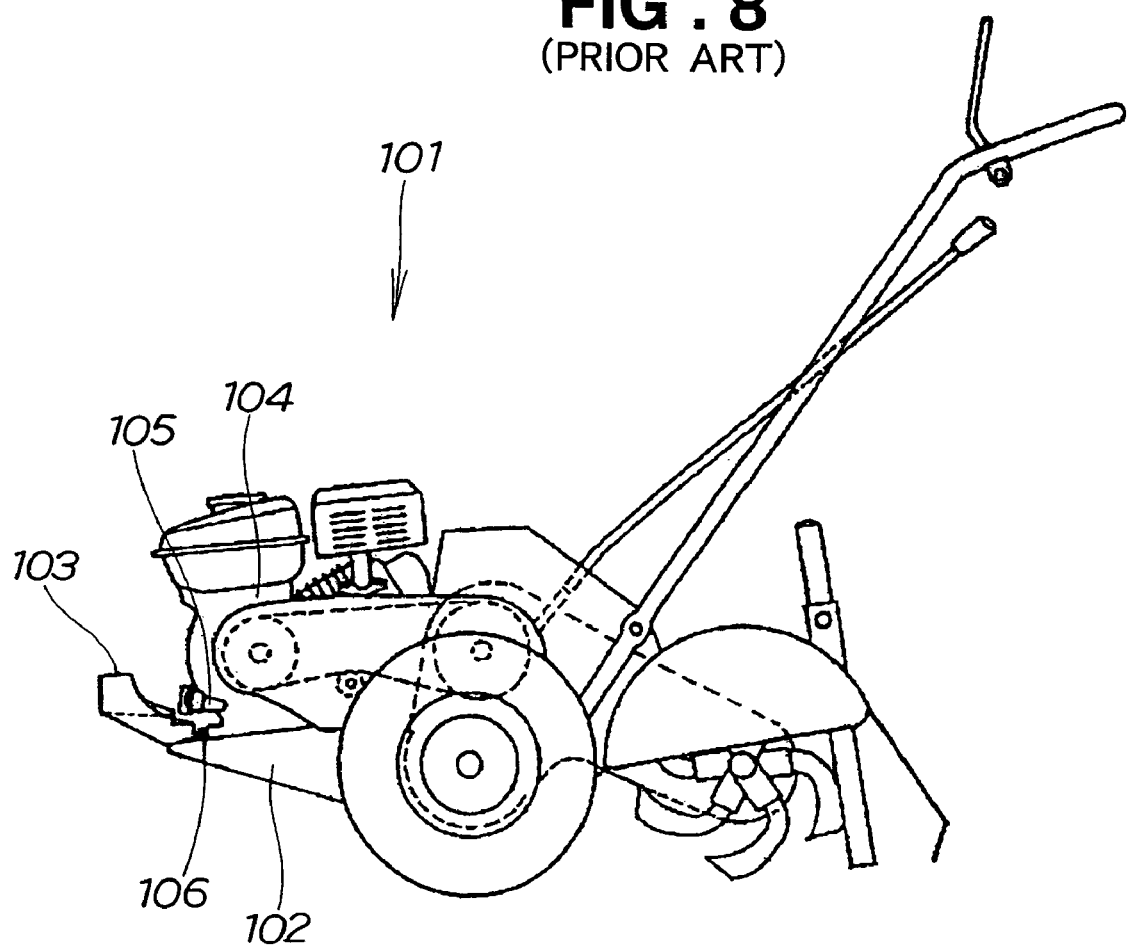
FIG. 8 is a view of a conventional walk-behind tiller having an oil drain port.

Next, the operation of draining the engine oil in the transmission case 27 will be described with reference to FIGS. 3 and 7.

First, the plug bolt 58 is loosened and removed from the oil outlet 54. The engine oil 91 discharged from the oil outlet 54 is received and collected by containers 88, 88 previously disposed below the oil outlet 54. At that time, the engine oil 91 discharged as shown by arrow a6 from the oil outlet 54 flows from the oil receiving portion 55, down the boss 57 as shown by arrow a7, and finally drips from the head 71 of the bolt 66 (see FIG. 6) as shown by arrow a8, thus being prevented from spreading to the outer surface of the transmission case 27. Accordingly, the engine oil 91 discharged from the oil outlet 54 can be prevented from spreading, and the engine oil 91 adhering to the boss 57 is easily wiped off.

The engine oil 91 discharged from the oil outlet 54 runs from the oil receiving portion 55, down the boss 57, and finally drips from the bolt head 71, as described above, so that an adhering area of the engine oil 91 around the oil outlet 54 is reduced. Consequently, dirt such as earth, grass or dust attaching to the engine oil 91 can be reduced.

As shown in FIG. 3, since the outflow path 64 is formed in the oil receiving portion 55, and the outer surface 73 of the fastening boss 57 is formed nearly directly below and continuously with the opening 72 of the outflow path 64, the fastening boss 57 can be used as a part for directing the engine oil 91 and preventing spreading of the engine oil 91. This eliminates the need for providing a member solely for directing the engine oil 91, resulting in weight reduction.

Obviously, various minor changes and modifications of the present invention are possible in the light of the above teaching. It is therefore to be understood that within the scope of the appended claims the invention may be practiced otherwise than as specifically described.

What is claimed is:

1. A front rotary working machine comprising:
   an engine;
   a transmission case of a power transmission mounted to a lower portion of the engine, the transmission case comprising a case body and a clutch case;
   an oil outlet for discharging engine oil from the clutch case;
   an oil receiving portion formed in the clutch case and disposed directly below the oil outlet, the oil receiving portion having an outflow path configured to direct the engine oil to an opening of the outflow path;

a fastening boss formed in the case body for fastening the case body to the clutch case so that an outer surface of the fastening boss is positioned substantially below and adjacent to the opening of the outflow path of the oil receiving portion; and rotary working portions provided at a front portion of the transmission case.

2. A working machine as set forth in claim 1; wherein the outflow path of the oil receiving portion has a bottom portion and a plurality of side portions rising from a periphery of the bottom portion.

3. A working machine as set forth in claim 2; wherein the bottom portion of the outflow path is inclined downward toward an exterior of the transmission case.

4. A working machine as set forth in claim 1; wherein the fastening boss has a through-hole; and further comprising a fastener that extends through the through-hole of the fastening boss for fastening the case body to the clutch case to position the outer surface of the fastening boss substantially below and adjacent to the opening of the outflow path of the oil receiving portion so that engine oil discharged from the oil outlet flows into and along the outflow path of the oil receiving portion and down the outer surface of the fastening boss.

5. A working machine as set forth in claim 4; wherein the fastener has a tip portion and a head portion; and wherein when the fastener extends through the through-hole of the fastening boss, the tip portion of the fastener extends from an upper end of the fastening boss and engages the clutch case and the head portion of the fastener is positioned at a lower end of the fastening boss so that when engine oil is discharged from the oil outlet, the engine oil flows into and along the outflow path of the oil receiving portion, down the outer surface of the fastening boss and drips from the head portion of the fastener.

6. A working machine as set forth in claim 5; wherein the clutch case has an internally threaded boss portion for threaded engagement with a threaded part of the tip portion of the fastener.

7. A working machine as set forth in claim 1; wherein the fastening boss is formed in one piece with the case body.

8. A working machine as set forth in claim 1; wherein the oil receiving portion has a bottom portion and a plurality of side portions extending upwardly from the bottom portion, an end face of the oil outlet being disposed above a substantially central part of the bottom portion.

9. A working machine as set forth in claim 8; wherein the outflow path of the oil receiving portion extends from the bottom portion to an outer surface of the clutch case.

10. A working machine as set forth in claim 9; wherein the bottom portion is inclined with a downslope so that when engine oil is discharged from the oil outlet, the engine oil flows into and along the outflow path and is directed to the outer surface of the clutch case to thereby direct the engine oil to the outer surface of the fastening boss.

11. A working machine comprising:

an engine;

a power transmission including a transmission case mounted to a portion of the engine, the transmission case comprising:

a clutch case having an oil outlet for discharging engine oil and an oil receiving portion disposed directly below the oil outlet, the oil receiving portion having a bottom portion formed continuously with an outer surface of the clutch case, a side portion formed continuously with the bottom portion, and an outflow path formed in the side portion and terminating with an opening;

a case body having a fastening boss provided with a through-hole; and a fastener that extends through the through-hole of the fastening boss of the case body for fastening the case body to the clutch case to position an outer surface of the fastening boss substantially below and adjacent to the opening of the outflow path of the oil receiving portion so that engine oil discharged from the oil outlet flows into and along the outflow path of the oil receiving portion and down the outer surface of the fastening boss; and at least one working member extending from the transmission case.

12. A working machine as set forth in claim 11; wherein the fastener has a tip portion and a head portion; and wherein when the fastener extends through the through-hole of the fastening boss, the tip portion of the fastener extends from an upper end of the fastening boss and engages the clutch case and the head portion of the fastener is positioned at a lower end of the fastening boss so that when engine oil is discharged from the oil outlet, the engine oil flows into and along the outflow path of the oil receiving portion, down the outer surface of the fastening boss and drips from the head portion of the fastener.

13. A working machine as set forth in claim 12; wherein the clutch case has an internally threaded boss portion for threaded engagement with a threaded part of the tip portion of the fastener.

14. A working machine as set forth in claim 12; wherein the fastening boss is formed in one piece with the case body.

15. A working machine as set forth in claim 12; wherein the oil outlet has an end face disposed above a substantially central part of the bottom portion of the oil receiving portion.

16. A working machine as set forth in claim 12; wherein the outflow path of the oil receiving portion extends from the bottom portion to the outer surface of the clutch case.

17. A working machine as set forth in claim 16; wherein the bottom portion of the oil receiving portion is inclined with a downslope so that when engine oil is discharged from the oil outlet, the engine oil flows into and along the outflow path and is directed to the outer surface of the clutch case to thereby direct the engine oil to the outer surface of the fastening boss.

18. A working machine as set forth in claim 11; wherein the fastening boss is formed in one piece with the case body.

19. A working machine as set forth in claim 11; wherein the oil outlet has an end face disposed above a substantially central part of the bottom portion of the oil receiving portion.

20. A working machine as set forth in claim 11; wherein the outflow path of the oil receiving portion extends from the bottom portion to the outer surface of the clutch case.

* * * * *